US011360554B2

(12) United States Patent
Peterson et al.

(10) Patent No.: US 11,360,554 B2
(45) Date of Patent: Jun. 14, 2022

(54) DEVICE ACTION BASED ON PUPIL DILATION

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John Carl Mese, Cary, NC (US); Arnold S. Weksler, Raleigh, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 158 days.

(21) Appl. No.: 16/840,342

(22) Filed: Apr. 4, 2020

(65) Prior Publication Data

US 2021/0311548 A1 Oct. 7, 2021

(51) Int. Cl.
*G06F 3/01* (2006.01)
*G06Q 30/02* (2012.01)
*G06F 3/16* (2006.01)
*G06F 3/0484* (2022.01)
*G06F 3/04842* (2022.01)

(52) U.S. Cl.
CPC ......... *G06F 3/013* (2013.01); *G06Q 30/0271* (2013.01); *G06F 3/0484* (2013.01); *G06F 3/04842* (2013.01); *G06F 3/167* (2013.01); *G06F 2203/011* (2013.01)

(58) Field of Classification Search
CPC ........ G06F 3/013; G06F 3/167; G06F 3/0484; G06F 3/04842; G06F 2203/011; G06Q 30/0271

USPC ........................................................ 345/156
See application file for complete search history.

(56) References Cited

U.S. PATENT DOCUMENTS

| 10,237,304 | B1* | 3/2019 | Sokolov | G06F 3/011 |
| 10,821,886 | B1* | 11/2020 | Breedvelt-Schouten | G06F 3/013 |
| 10,831,268 | B1* | 11/2020 | Golard | G06F 3/013 |
| 10,928,904 | B1* | 2/2021 | Novelli | G06K 9/00597 |
| 2010/0110368 | A1* | 5/2010 | Chaum | G02B 27/017 351/158 |
| 2013/0127980 | A1* | 5/2013 | Haddick | G02B 27/0093 348/14.08 |

(Continued)

OTHER PUBLICATIONS

"7 Things That Make Your Pupils Change in Size", Auckland Eye, Jul. 11, 2018, https://www.aucklandeye.co.nz/about/blog/7-things-that-make-your-pupils-change-in-size/.

(Continued)

*Primary Examiner* — Tom V Sheng
(74) *Attorney, Agent, or Firm* — John M. Rogitz; John L. Rogitz

(57) ABSTRACT

In one aspect, a device may include at least one processor, a camera accessible to the at least one processor, and storage accessible to the at least one processor. The storage may include instructions executable by the at least one processor to receive input from the camera and to determine, based on the input from the camera, that a change in the dilation of a user's pupils has occurred. The instructions may also be executable to perform at least one action at a device based on the determination, where the at least one action may be related to the user's interest in at least a portion of content presented using the device.

20 Claims, 5 Drawing Sheets

(56) References Cited

U.S. PATENT DOCUMENTS

2013/0278631 A1* 10/2013 Border .................. G02C 5/143
　　　　　　　　　　　　　　　　　　　345/633
2020/0312268 A1* 10/2020 Nicholson .......... G06K 9/00597
2021/0035298 A1*  2/2021 Yildiz .................. G06T 11/001
2021/0132690 A1*  5/2021 Yudanov ............ G02B 27/0172

OTHER PUBLICATIONS

"FYI about your Eyes", The University of Illinois College of Medicine, https://chicago.medicine.uic.edu/departments/academic-departments/ophthalmology-visual-sciences/our-department/media-center/eye-facts/fyi-about-your-eyes/.

"It's music to my eyes." University of Vienna. ScienceDaily. ScienceDaily, Nov. 12, 2015.

\* cited by examiner

DEVICE ACTION BASED ON PUPIL DILATION

FIELD

The present application relates to technically inventive, non-routine solutions that are necessarily rooted in computer technology and that produce concrete technical improvements.

BACKGROUND

As recognized herein, current computer-based user interfaces through which a user might express interest in a piece of digital content or through which the user might interact with the computer in still other ways can be complex and confusing. There are currently no adequate solutions to the foregoing computer-related, technological problem.

SUMMARY

Accordingly, in one aspect a device includes at least one processor, a camera accessible to the at least one processor, a display accessible to the at least one processor, and storage accessible to the at least one processor. The storage includes instructions executable by the at least one processor to receive input from the camera and to determine, based on the input from the camera, that a change in the dilation of a user's pupils has occurred. The storage also includes instructions to, based on the determination, take at least one action related to interest in a portion of content presented on an area of the display at which the user is identified as looking.

In some examples, the change in dilation may include an enlargement of the circumference of the pupils.

Further, in some implementations the device may be a first device and the at least one action may include electronically transmitting data to a second device indicating the user's interest in the portion of the content. For example, the portion of the content may include a social media post and the data indicating the user's interest may include data that the user "liked" the social media post. As another example, the portion of the content may include an image presented on the display as part of a website.

Additionally, in some implementations the at least one action may include presenting a graphical user interface (GUI) on the display, where the GUI may include a prompt regarding whether the user would like assistance with a website. In these implementations, the portion of the content may include a portion of the website.

Also in some implementations, the instructions may be executable to identify an amount of ambient light using the camera and to determine that the change in the dilation of the user's pupils has occurred while ambient light stays within a threshold of the amount.

Additionally, note that the user may be identified as looking at the area of the display based on input from the camera and that the portion of the content may not include the entirety of the content presented on the display while the portion is presented. Still further, if desired the user may be identified as looking at the area using eye tracking software.

In another aspect, a method includes receiving input from a camera and determining, based on the input from the camera, that a change in the dilation of a user's pupils has occurred. The method also includes taking at least one action at a device based on the determining, where the at least one action is related to the user's interest in at least a portion of content presented using the device.

In some examples, the change in dilation may include a shrinking of the circumference of the pupils.

Additionally, in some embodiments the device may be a first device and the at least one action may include electronically transmitting data to a second device indicating the user's interest in at least the portion of the content. The content may include audio content presented using one or more speakers accessible to the device. Additionally or alternatively, the portion of the content may include a social media post and the data indicating the user's interest may include data that the user "liked" the social media post. Still further, the portion of the content may include visual content presented as part of a web site.

Also in some examples, the at least one action may include presenting a graphical user interface (GUI) on an electronic display, where the GUI may include a prompt regarding whether the user would like assistance navigating a website.

Still further, in some implementations the method may include identifying an amount of ambient light around the user and determining that the change in the dilation of the user's pupils has occurred while ambient light stays within a threshold of the amount.

In still another aspect, at least one computer readable storage medium (CRSM) that is not a transitory signal includes instructions executable by at least one processor to receive input from a camera and to determine, based on the input from the camera, that a change in the dilation of a user's pupils has occurred. The instructions are also executable to perform at least one action at a device based on the determination, where the at least one action is related to the user's interest in at least a portion of content presented using the device.

In some examples, the at least one action may include one or more of presenting a prompt asking whether the user would like assistance, "liking" a particular social media post, and/or approving of a particular piece of content provided through a website or content streaming service.

The details of present principles, both as to their structure and operation, can best be understood in reference to the accompanying drawings, in which like reference numerals refer to like parts, and in which:

DETAILED DESCRIPTION

Figure 1:
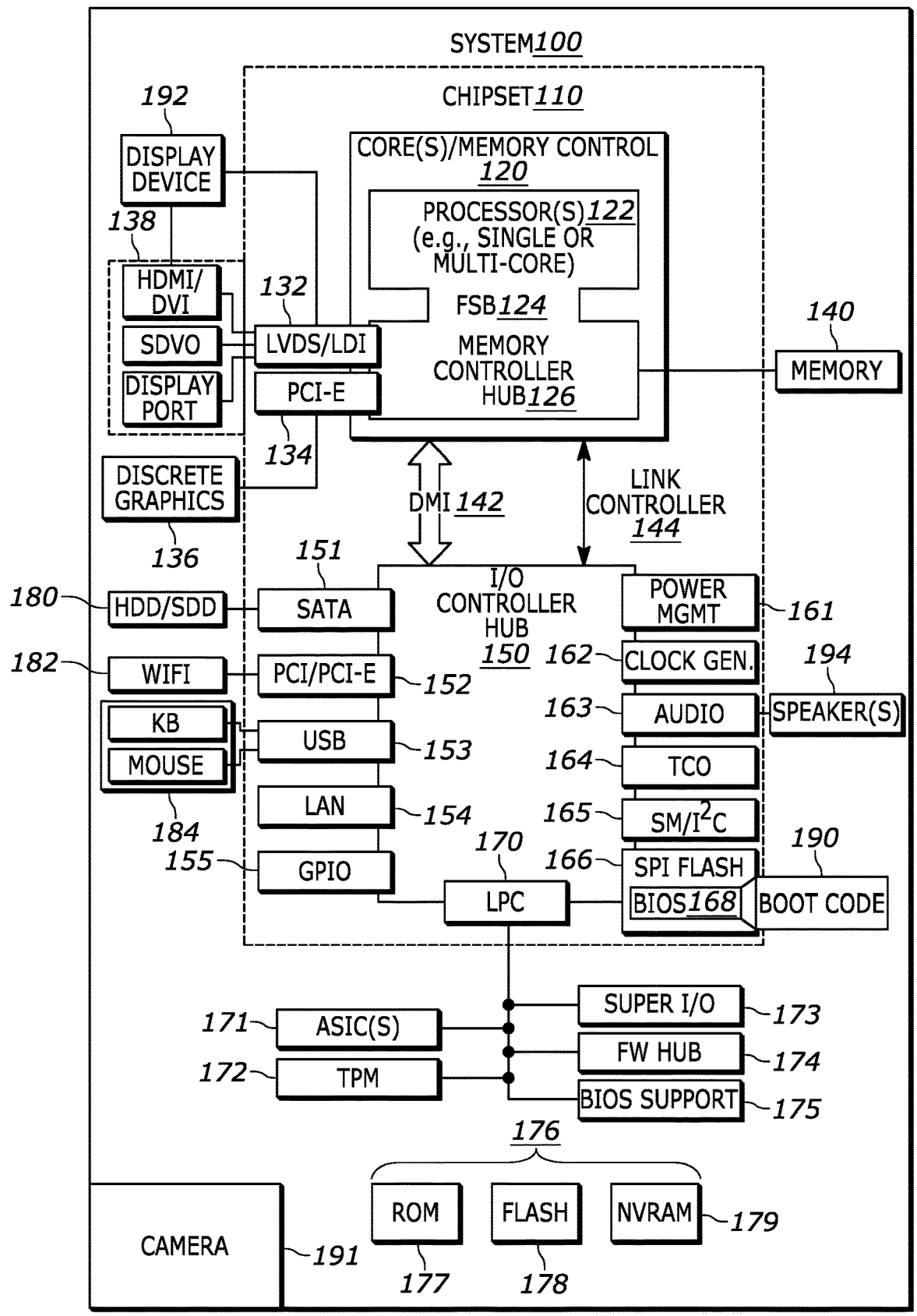
FIG. 1 is a block diagram of an example system consistent with present principles.

The present application recognizes that a person's pupils dilating can indicate certain things such as approval, happiness, or even a complicated thought process or other brain activity. Conversely, the person's pupils constricting can indicate anger, dislike, or frustration on the part of the person.

Accordingly, the present application discloses use of dilations and constrictions to determine, e.g., which digital content a user is most interested in. For example, when a user is listening to or viewing digital media, if pupil dilation is observed, then the media platform can "+1", "like", or "thumbs up" that particular media. In some examples, this could even be based on a threshold number of observed dilations occurring for this media or type of media before the "like" is applied.

As another example, the principle of diminishing returns may be used in that as the user continues to consume the same digital media in the future (or same type of digital content), should the user no longer exhibit the same dilation as a reaction to the media, the "like", "+1" or "thumbs up" could be removed. This too may be an action taken upon identification of a threshold number of non-changes to pupil dilation when viewing that content/content type. Furthermore, in some examples the identified non-changes to pupil dilation may simply remove the "like", "+1" or "thumbs up" without necessarily also de-prioritizing or "disliking", "−1" or "thumbs downing" the content, though that too might occur in other examples.

Present principles may also be applied in certain implementations to help websites determine user acceptance or frustration with a particular website feature or the website in general. For example, changes in pupil dilation can be used to determine if a survey might be needed to help a user. If so, based on the user's pupil dilation or non-dilation the website could further help to focus the survey on the website feature in question by dynamically changing or presenting different surveys or other information based on whatever feature of the website is being looked at.

So, for example, if the user is trying to traverse a set of menus on a website and there's a lot of brain activity involved in doing so, this could be tracked through changes in pupil dilation to indicate to the website's operator that the menus are too complicated. This change in pupil dilation could also indicate user frustration from trying to determine what to click on to get to the specific thing they are looking for and so that too could help the website operators to generally determine problem areas or areas of interest, etc.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include a camera 191 that gathers one or more images and provides input related thereto to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Still further, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. The system 100 may also include an audio receiver/microphone that provides input from the microphone to the processor 122 based on audio that is detected, such as via a user providing audible input to the microphone. Additionally, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
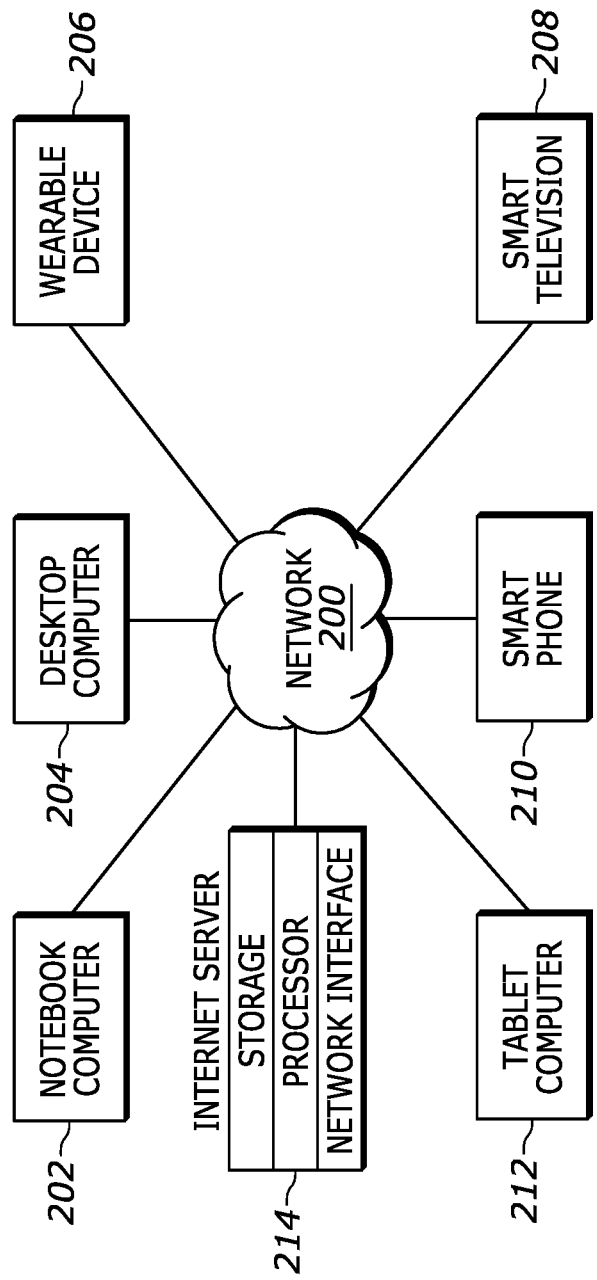
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
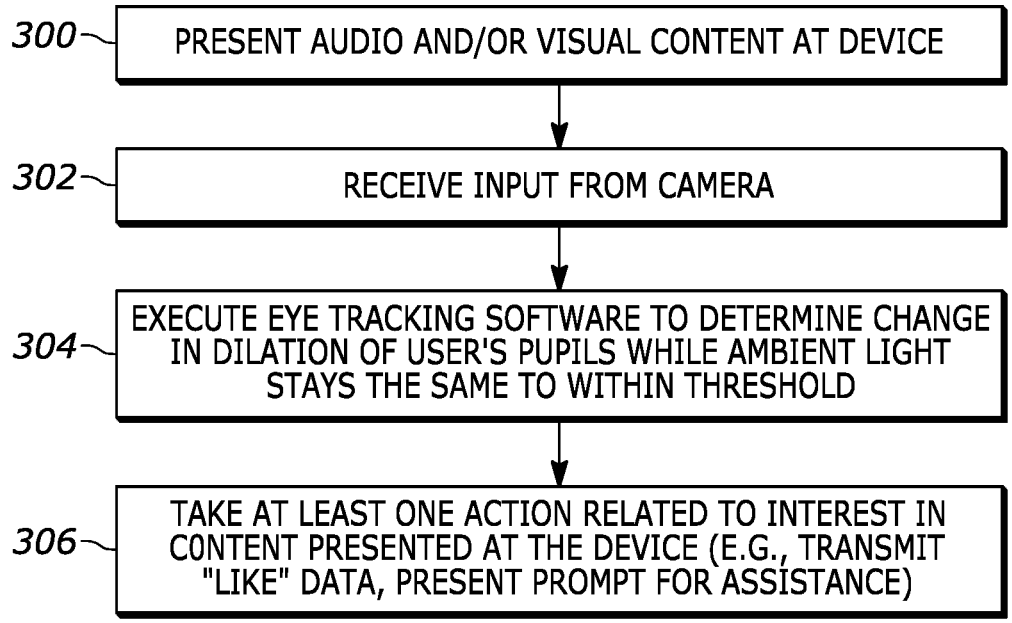
FIG. 3 is a flow chart of an example algorithm consistent with present principles.

Referring to FIG. 3, it shows example logic that may be executed by a device such as the system 100 in accordance with present principles. The logic may be executed by the device to detect changes in a user's pupil dilation and to take an action based on that as disclosed herein.

Accordingly, the logic may begin at block 300 where the device may begin presenting content. For example, the device may present audio-only content such as a song or speech recording, visual-only content such as an image presented as part of a web page, or audio-visual content (AV) such as a movie or online video.

After block 300 the logic may proceed to block 302. At block 302 the device may receive input (e.g., images) from a camera on the device or otherwise in communication with the device to track the user's eyes. For example, the device may be a smart phone and the smart phone's camera may be oriented outward from a front-facing surface on a same side of the smart phone as its electronic display so that the user's eyes may be tracked to identify what visual content on the display the user is looking at. Laptop cameras and Internet of things (IoT) cameras wirelessly communicating with the device may also be used, for example.

In any case, from block 302 the logic may proceed to block 304. At block 304 the device may execute eye tracking software to track the user's eyes using input from the camera as the user looks at visual content presented on the device's display and/or as the user hears audio content presented through the device's speakers. The device may then determine, using the input from the camera and the eye tracking software, whether the user's pupils have dilated (enlarged) or constricted (shrunk) while fixed on a piece of visual content or while the audio content continues to be presented. To determine dilation or constriction, the size of the user's pupils may be tracked by the device over time to determine dilation or constriction relative to the pupils' circumference or diameter when the content that is currently being observed by the user was initially presented at the device (e.g., at block 300).

In some examples and to remove ambient light as a variable affecting changes in pupil dilation to thus increase device confidence in determinations of user interest (or disinterest), at block 304 the device may also identify and track ambient light levels around the user as indicated in images from the camera. In these examples, the device may determine that a change in the dilation of the user's pupils has occurred while ambient light stays within a threshold of the amount of ambient light that was identified as existing around the user when the content that is currently being observed by the user was initially presented at the device. For example, the threshold may be plus or minus five lux. Thus, a device may take an action as described herein if the ambient light stays within the threshold during that time, and otherwise disregard the identified change in pupil dilation and not taken an action based on it.

Similarly, to remove change in the depth of the user's focus as a variable affecting changes in pupil dilation that might otherwise indicate user interest or disinterest in certain content (e.g., audio-only content), at block 304 the device may in some examples also track the user's line of sight as the user observes the content and/or as the content is presented. In these examples, a change in dilation of the user's pupils may be used as a trigger for the device to take an action consistent with present principles so long as the user continues to gaze continuously at one or more portions of the device itself but does not change his or her line of sight to a different direction than one in which the device is located relative to the user's eyes (e.g., even if the user does glance at different portions of the device itself during that time). But if the user's line of sight changes to the different direction while the same content is still being presented, an identified change in pupil dilation may be disregarded or the device may otherwise not take an action consistent with present principles.

Still in reference to FIG. 3, responsive to a determination that the user's pupils have dilated or constricted while certain content is presented (and in some examples while also accounting for ambient light changes and gaze direction changes as discussed above), the logic may move to block 306. At block 306 the device may take at least one action related to the user's interest in the content that is presented at the device, whether that be visual content, audio content, or audio-visual content. Examples of various actions a device might take are illustrated through FIGS. 4-6.

Figure 4:
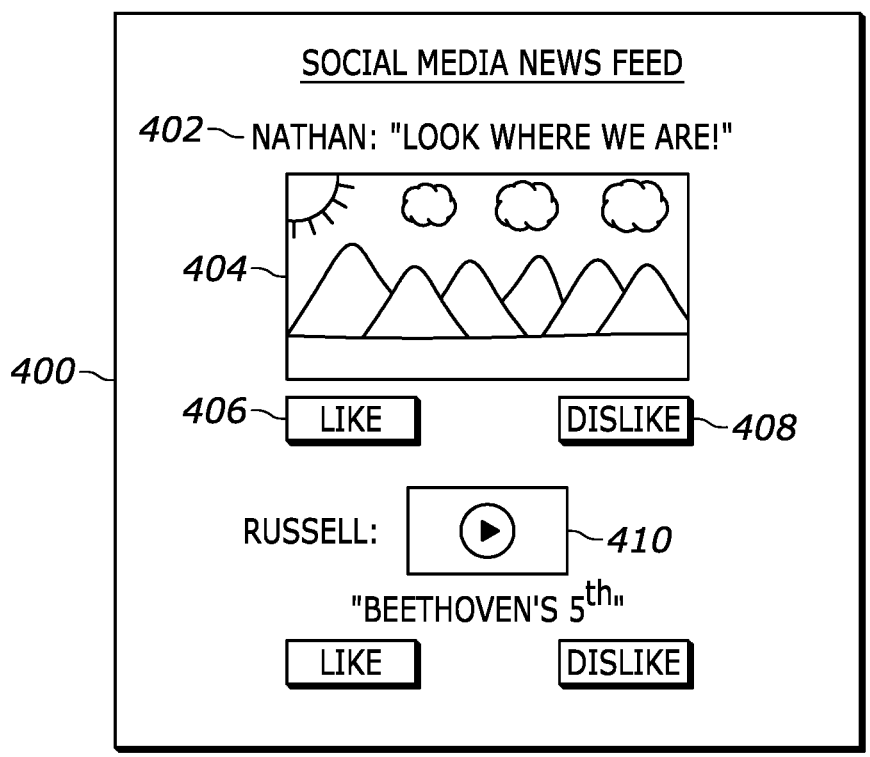
FIGS. 4-6 show examples for which a device may take action based on detecting a change in pupil dilation consistent with present principles.

For example and in reference to FIG. 4, suppose a user is scrolling through a social media news feed 400 presented on the device's display. The user then stops scrolling upon reaching a social media post 402 when it is presented on the display. The device may then use eye tracking software both to identify the user as looking at the image 404 in particular that forms part of the post 402, and to identify the user's eyes as dilating by more than a threshold amount while looking at the image 404. In response to those identifications, the device may select the "like" button 406 for the post 402 without additional user input beyond the looking and pupil dilation itself. Selection of the "like" button 406 may then cause the device to transmit "like" data indicating selection of the "like" button 406 for the post 402 to the associated social media service's server(s) itself (that is/are hosting the social media service).

Furthermore, if the user is determined to be looking at the image 404 or another part of the post 402 but no pupil dilation or constriction is identified as occurring (e.g., at least not by more than a threshold amount), or if the user continues on to viewing a subsequent post 410 related to music, then the device may do nothing in terms of selecting the button 406 or any other buttons related to the post 402 such as the "dislike" button 408.

However, since pupil constriction can indicate anger or at least displeasure in some instances, if the user is determined to be looking at the image 404 or another part of the post 402 and pupil constriction of more than a threshold amount is identified while the user continues to view that content uninterruptedly, then the device may select the "dislike" button 408 for the post 402 without additional user input beyond the looking and pupil constriction itself. Selection of the "dislike" button 408 may then cause the device to transmit "dislike" data indicating selection of the "dislike" button 408 for the post 402 to the associated social media service's server(s).

Figure 5:
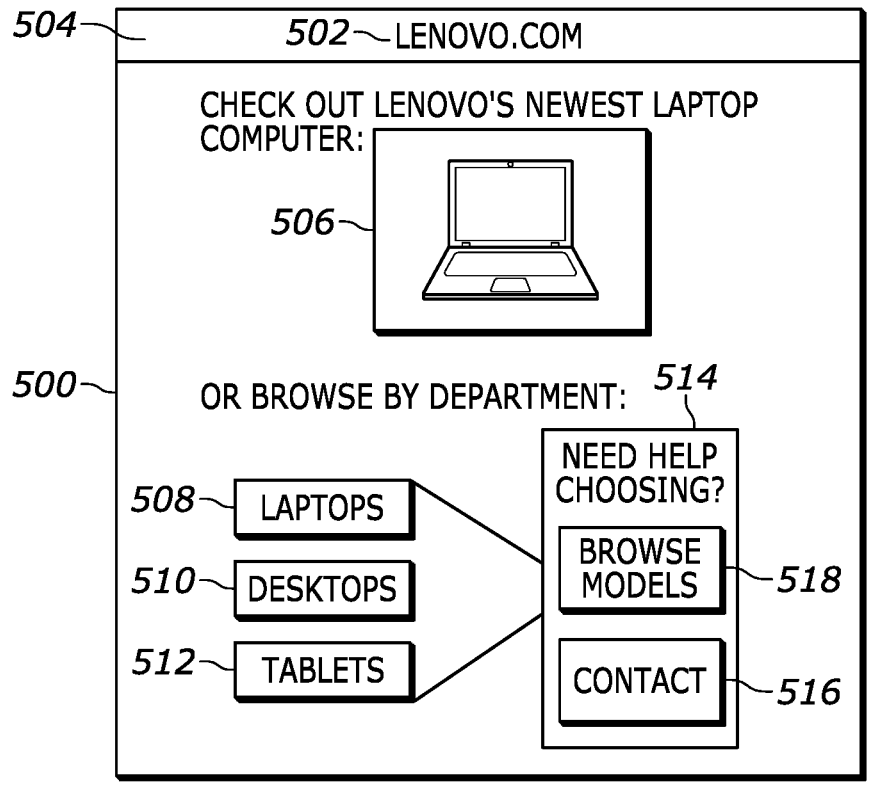

FIG. 5 shows another example. In FIG. 5, an example page 500 of a website for Lenovo is presented on the display of an end user's device along with a uniform resource locator (URL) 502 in an address bar 504 for the Internet browser being used to view the page 500. In addition to a top portion of the page 500 featuring a new laptop computer 506 manufactured by Lenovo, the page 500 includes a listing of selectors 508, 510, and 512 that may be selectable to browse computers available for purchase through the website by the respective computer type indicated on the respective selector.

Consistent with present principles, the device executing the logic of FIG. 3 may track the user's eyes as the user looks at various portions of the page 500 when it is presented on the device's display. The device may also track pupil size as the user views the selectors 508-512 and, responsive to identifying enlargement of the pupils that may indicate a relatively intense or complicated thought process by the user to choose which selector 508-512 to select, the device may communicate with the website to overlay a graphical user interface (GUI) 514 on part of the page 500 at a time later than when the page 500 itself was initially presented at the user's device.

As shown in FIG. 5, the GUI 514 may prompt the user through text regarding whether the user would like assistance choosing which type of computer type to browse. The GUI 514 may also include a contact selector 516 that may be selectable to initiate an online chat with a representative of Lenovo and/or to present another web page indicating contact information such as a telephone number to call or address at which to write the company. The GUI 514 may also include a selector 518 to browse all computers available for purchase by individual model rather than by computer type.

Additionally, note that if prior to or while the GUI 514 is presented, the user's eyes are identified as constricting while looking at one or more of the selectors 508-512, the device may infer frustration on the part of the user and take a different action such as communicating with the website to present a different GUI on top of the page 500. For example, the different GUI may include a search box for a user to type in a search term for searching the website to help the user locate whatever he or she might be looking for by keyword.

Furthermore, if the user is determined to be looking at one or more portions of the page 500 (such as the selectors 508-512) but no pupil dilation or constriction is identified as occurring (or at least not by more than a threshold amount), then the device may decline to present the GUI 514, to present the search box GUI referenced in the paragraph immediately above, or to take other action until additional user input is received to do so.

Figure 6:
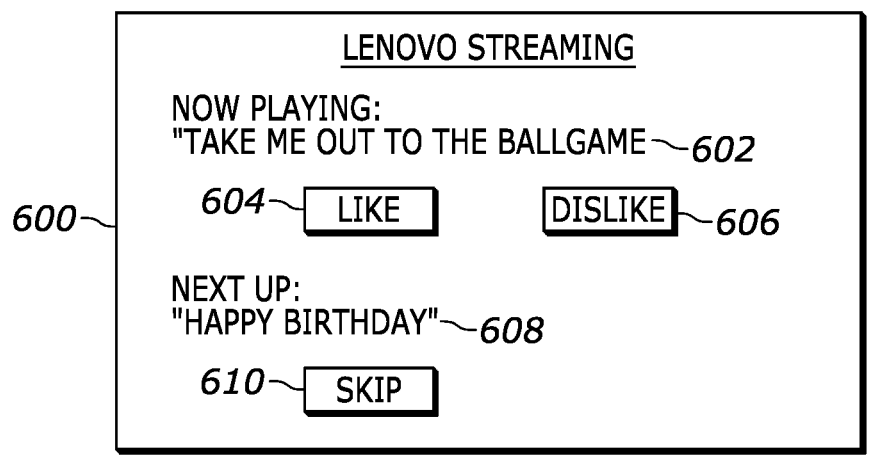

Now in reference to FIG. 6, another example is shown. In this example, a GUI 600 is presented on a device's display. The GUI 600 is for a media streaming service that is being used to stream audio content, visual content, or audio visual content at the device. In this example, the media that is being streamed is music and the current song being presented using the device's speaker(s) is Take Me Out to the Ballgame, as reflected in text 602.

While the song Take Me Out to the Ballgame is being presented, the device may determine that the user's pupils have dilated relative to their size prior to the beginning of the presentation of the song at the device. Based on identifying the pupil dilation, the device may select a "like" or "+1" button 604 presented on the device's display to then transmit "like" or "+1" data to the streaming service's server(s) indicating selection of the "like" or "+1" button for the song Take Me Out to the Ballgame.

If, however, the device determines while the song Take Me Out to the Ballgame is being presented that the user's pupils have constricted relative to their size prior to the beginning of the presentation of the song, then the device may select a "dislike" or "−1" button 606 presented on the device's display to then transmit "dislike" or "−1" data to the streaming service's server(s) indicating selection of the "dislike" or "−1" button for the song Take Me Out to the Ballgame. Additionally or alternatively, if pupil constriction is identified then the device may "skip" the rest of the song Take Me Out to the Ballgame by ceasing to present the remainder of the song left to be played. The device may then begin presenting another song determined by the streaming service, selected from a playlist, etc., such as the song Happy Birthday that is indicated on the GUI 600 as being the next song that will be presented.

Furthermore, if no pupil dilation or constriction is identified as occurring (or at least not by more than a threshold amount) while the device plays the song Take Me Out to the Ballgame, then the device may neither select the "like" button 604 or "dislike" button 606 and hence not transmit any associated data regarding selection of either button to the streaming service itself.

As also shown in FIG. 6, text 608 indicating the next song that is to be presented after Take Me Out to the Ballgame may also be presented as part of the GUI 600. In this example and as indicated above, the next song is Happy Birthday. Consistent with present principles, if the user begins looking at the text "Happy Birthday" and his or her pupils constrict, this may be detected by the device to indicate an adverse reaction to the upcoming song even if Take Me Out to the Ballgame is still playing rather than Happy Birthday itself. Responsive to the device identifying the constriction while the user looks at the text "Happy Birthday", the device may (without additional user input other than the looking and pupil constricting) select the skip button 610 to provide a command to the streaming service to skip or otherwise not present the song Happy Birthday upon completion of presentation of the song Take Me Out to the Ballgame and to instead present another song at the appropriate time.

Figure 7:
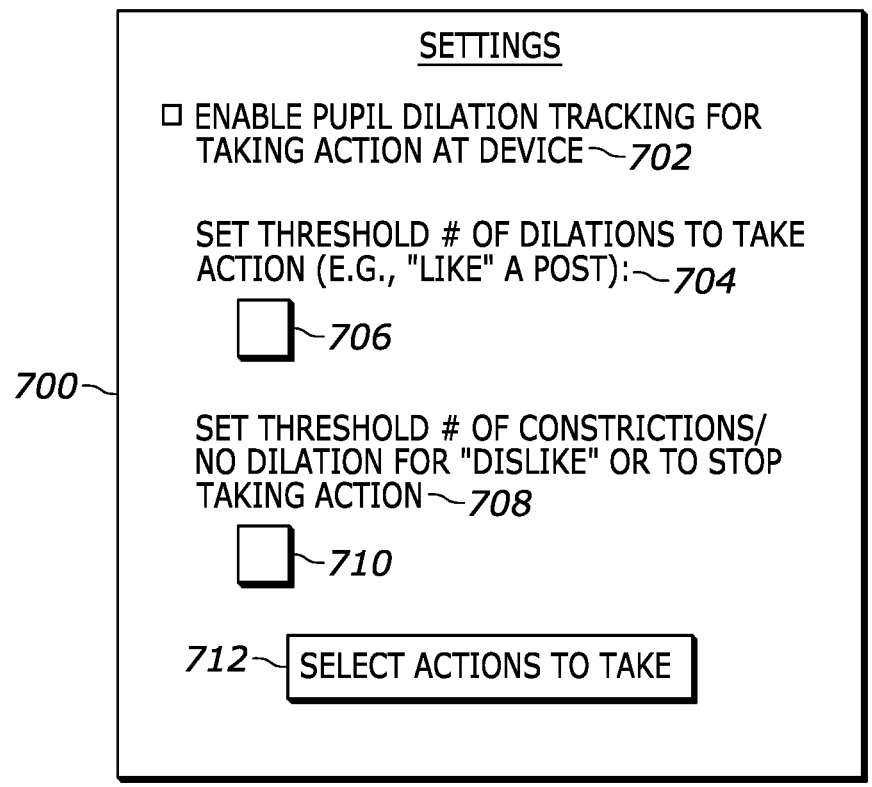
FIG. 7 shows an example graphical user interface (GUI) presentable on a display to configure one or more settings of a device operating consistent with present principles.

Now describing FIG. 7, it shows an example GUI 700 that may be presented on the display of a device configured to undertake present principles. The GUI 700 may be used to set or enable one or more settings of the device in order to undertake present principles.

As shown, the GUI 700 may include a first option 702 that may be selectable by directing touch or cursor input to the adjacent check box. The option 702 may be selected to set or enable the device to undertake present principles, such as to execute the logic of FIG. 3 and to undertake the actions described above in reference to FIGS. 4-6 in the future based on selection of the options 702.

The GUI 700 may also include a setting 704 at which a user may enter, to input box 706, a threshold number of times that dilations of pupils are to be detected for a particular piece of content or for contents of the same type before the device takes action based on the detection of dilation in relation to that content/type again. The threshold number may be two, for example.

Content types may be established by audio content, visual content, and audio-visual content. Content types may also be established by different types of content within a subset of one of those three. For instance, the types may be established by pictures of landscapes as opposed to pictures of people. As another example, the types may be established by music of a certain genre (e.g., rock) as opposed to music of another genre (e.g., classical). Additionally, content types may be established by the type of service through which the content itself is accessed, such as a social media service type, content streaming service type, or website type.

As also shown in FIG. 7, the GUI 700 may further include a setting 708 at which a user may enter, to input box 710, a threshold number of times that constrictions of pupils are to be detected for a particular piece of content or for contents of the same type before the device takes action based on the detection of constriction in relation to that content/type again. The threshold number of times may be three, for example.

Additionally or alternatively, input may be directed to box 710 to establish a threshold number of times that a user's pupils are to be detected as neither constricting nor dilating (e.g., by more than a threshold amount) while looking at a particular piece of content or content type. Thus, once this threshold is met, the device may in the future stop taking action it would otherwise take based on pupil dilation or constriction when the particular piece of content or content type is presented again. This threshold number of times may be five, for example.

Still further, in some examples the GUI 700 may include a selector 712. The selector 712 may be selected to command the device to present another GUI from which the user may select particular actions for the device to take (and/or to not take) based on pupil dilations and pupil constrictions.

Before concluding, it is to be understood that other actions than those described above might be taken by a device responsive to detecting a change in the dilation of a user's pupils consistent with present principles. For example, if a user's pupils dilate as the user looks at hyperlinked text or a hyperlinked image, the hyperlinked text or image may be selected for the device to then navigate to a page associated with the hyperlink. Or if the user's pupils dilate as the user looks at the subject line of an email in the user's email inbox, in response the device may select and present the email itself on its display.

Additionally, note that in some examples a device may present an icon or other graphical object indicating detection of pupil dilation or constriction responsive to identifying the dilation or constriction itself. For example, responsive to detecting a dilation while the user looks at the image 404 of FIG. 4, the device may not only visually indicate selection of the "like" button 406 via shading of that button but also overlay an icon of a smiling face onto another portion of the GUI 400 such as the top right corner. Conversely, responsive to detecting a constriction while the user looks at the image 404 of FIG. 4, the device may not only visually indicate selection of the "dislike" button 408 via shading of that button but also overlay an icon of a frowning face onto the top left corner of the GUI 400. These icons may thus indicate to the user that the device is taking a certain action based on detection of the dilation or constriction.

Also before concluding, it is to be understood consistent with present principles that in some examples an end-user's device (e.g., smart phone) may stream input from its camera to a remotely-located server hosting a social media service, content streaming service, website, etc. for the server to then make a determination on a change in the user's pupil dilation and to take a certain action accordingly (e.g., "liking" a social media post on the user's behalf).

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a camera accessible to the at least one processor;
   a display accessible to the at least one processor; and
   storage accessible to the at least one processor and comprising instructions executable by the at least one processor to:
   receive input from the camera;
   determine, based on the input from the camera, that a change in dilation of a user's pupils has occurred; and
   based on the determination, take at least one action related to interest in a portion of content presented on an area of the display at which the user is identified as looking, wherein the at least one action comprises electronically transmitting data to a second device indicating the user's interest in the portion of the content.

2. The first device of claim 1, wherein the change in dilation comprises an enlargement of the circumference of the pupils.

3. The first device of claim 1, wherein the portion of the content comprises a social media post, and wherein the data indicating the user's interest comprises data that the user "liked" the social media post.

4. The first device of claim 1, wherein the portion of the content comprises an image presented on the display as part of a website.

5. The first device of claim 1, wherein the at least one action comprises presenting a graphical user interface (GUI) on the display, the GUI comprising a prompt regarding whether the user would like assistance with a website, the portion of the content comprising a portion of the website.

6. The first device of claim 1, wherein the instructions are executable to:
identify, using the camera, an amount of ambient light; and
determine that the change in dilation of the user's pupils has occurred while ambient light stays within a threshold of the amount.

7. The first device of claim 1, wherein the user is identified as looking at the area of the display based on input from the camera.

8. The first device of claim 1, wherein the portion of the content does not comprise the entirety of the content presented on the display while the portion is presented.

9. The first device of claim 1, wherein the user is identified as looking at the area using eye tracking software.

10. A method, comprising:
receiving input from a camera;
determining, based on the input from the camera, that a change in dilation of a user's pupils has occurred; and
based on the determining, taking at least one action at a first device, the at least one action being related to the user's interest in at least a portion of content presented using the first device, wherein the at least one action comprises electronically transmitting data to a second device indicating the user's interest in at least the portion of the content.

11. The method of claim 10, wherein the change in dilation comprises a shrinking of the circumference of the pupils.

12. The method of claim 10, wherein the content comprises audio content presented using one or more speakers accessible to the first device.

13. The method of claim 10, wherein the portion of the content comprises a social media post, and wherein the data indicating the user's interest comprises data that the user "liked" the social media post.

14. The method of claim 10, wherein the portion of the content comprises visual content presented as part of a website.

15. The method of claim 10, wherein the at least one action comprises presenting a graphical user interface (GUI) on an electronic display, the GUI comprising a prompt regarding whether the user would like assistance navigating a website.

16. The method of claim 10, comprising:
identifying an amount of ambient light around the user; and
determining that the change in dilation of the user's pupils has occurred while ambient light stays within a threshold of the amount.

17. At least one computer readable storage medium (CRSM) that is not a transitory signal, the computer readable storage medium comprising instructions executable by at least one processor to:
receive input from a camera;
determine, based on the input from the camera, that a change in dilation of at least one of a user's pupils has occurred; and
based on the determination, perform at least one action at a device, the at least one action being related to the user's interest in at least a portion of content presented using the device, wherein the at least one action comprises one or more of:
presenting a prompt asking whether the user would like assistance, "liking" a particular social media post, approving of a particular piece of content provided through a website or content streaming service.

18. The CRSM of claim 17, wherein the at least one action comprises presenting a prompt asking whether the user would like assistance.

19. The CRSM of claim 17, wherein the at least one action comprises "liking" a particular social media post.

20. The CRSM of claim 17, wherein the at least one action comprises approving of a particular piece of content provided through a website or content streaming service.

* * * * *